Patented Oct. 14, 1952

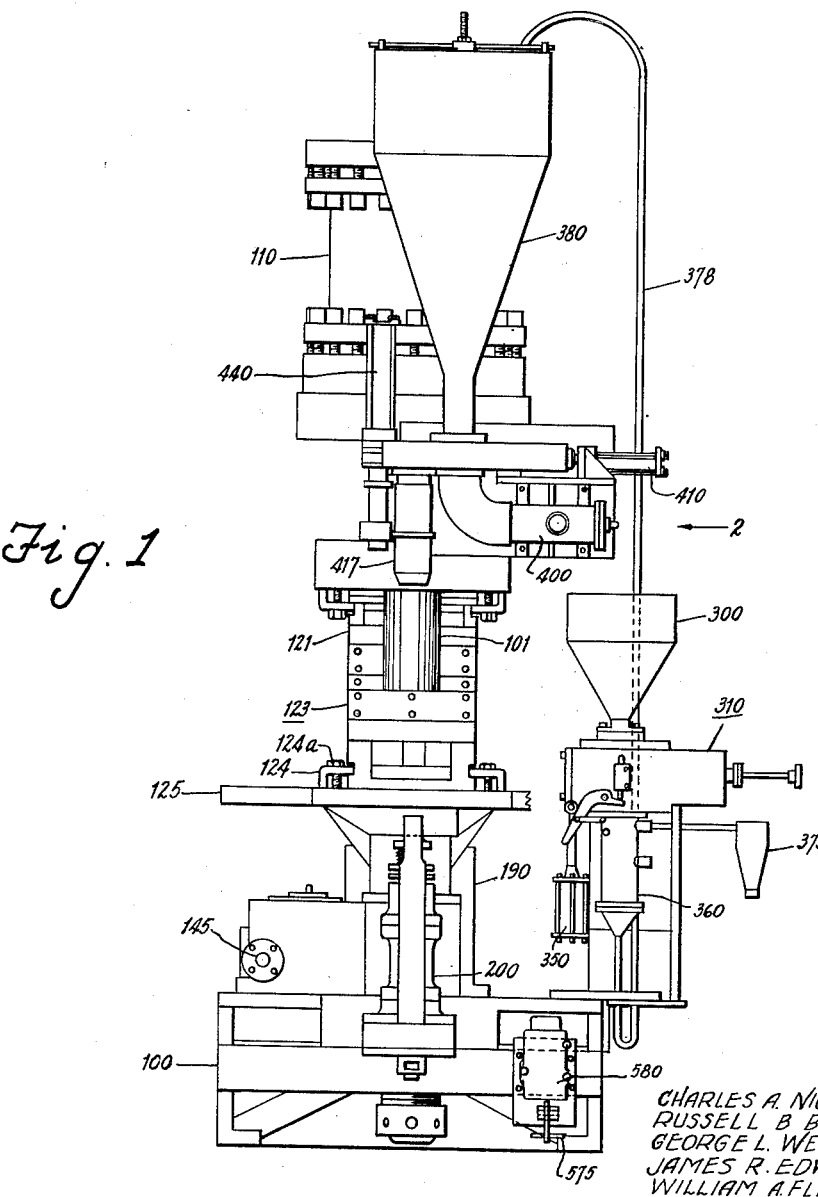

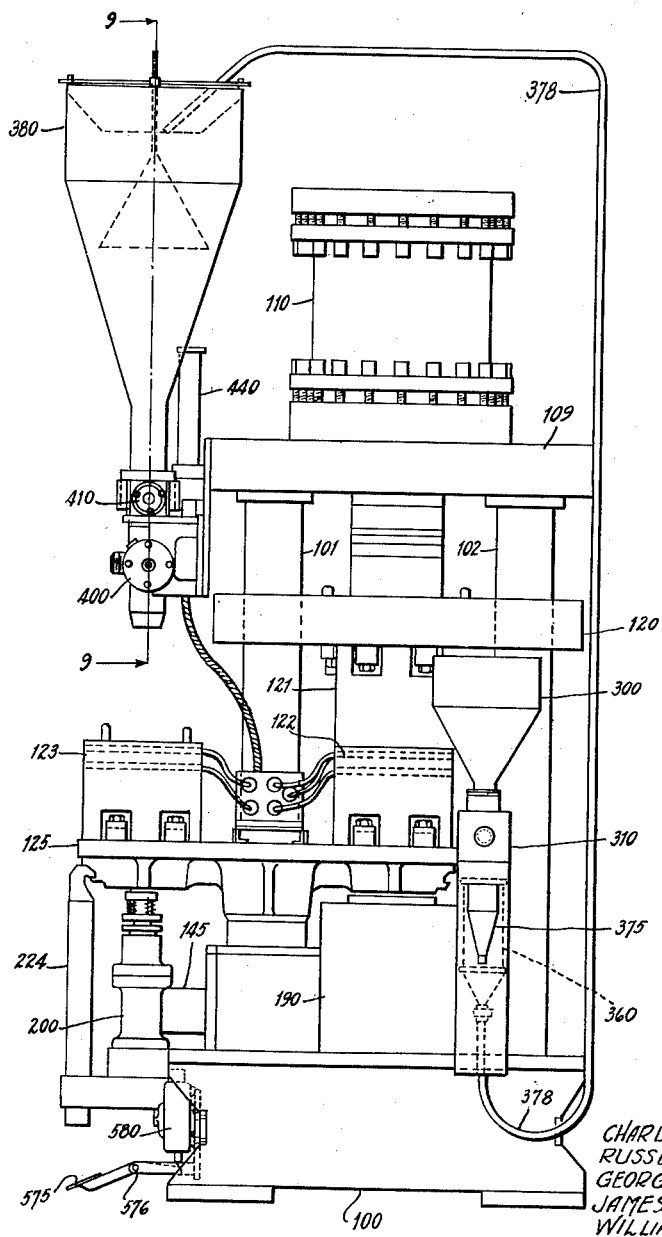

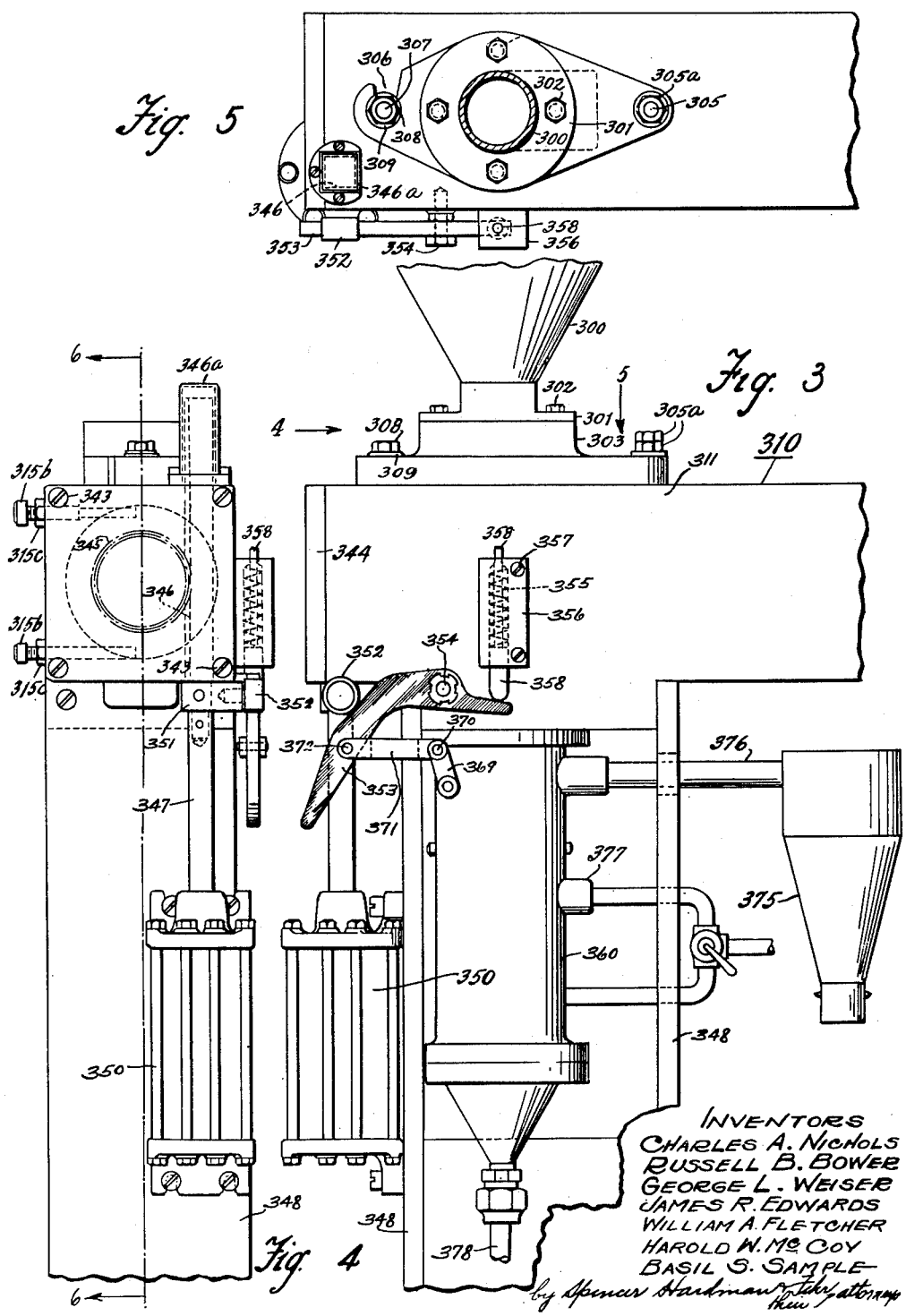

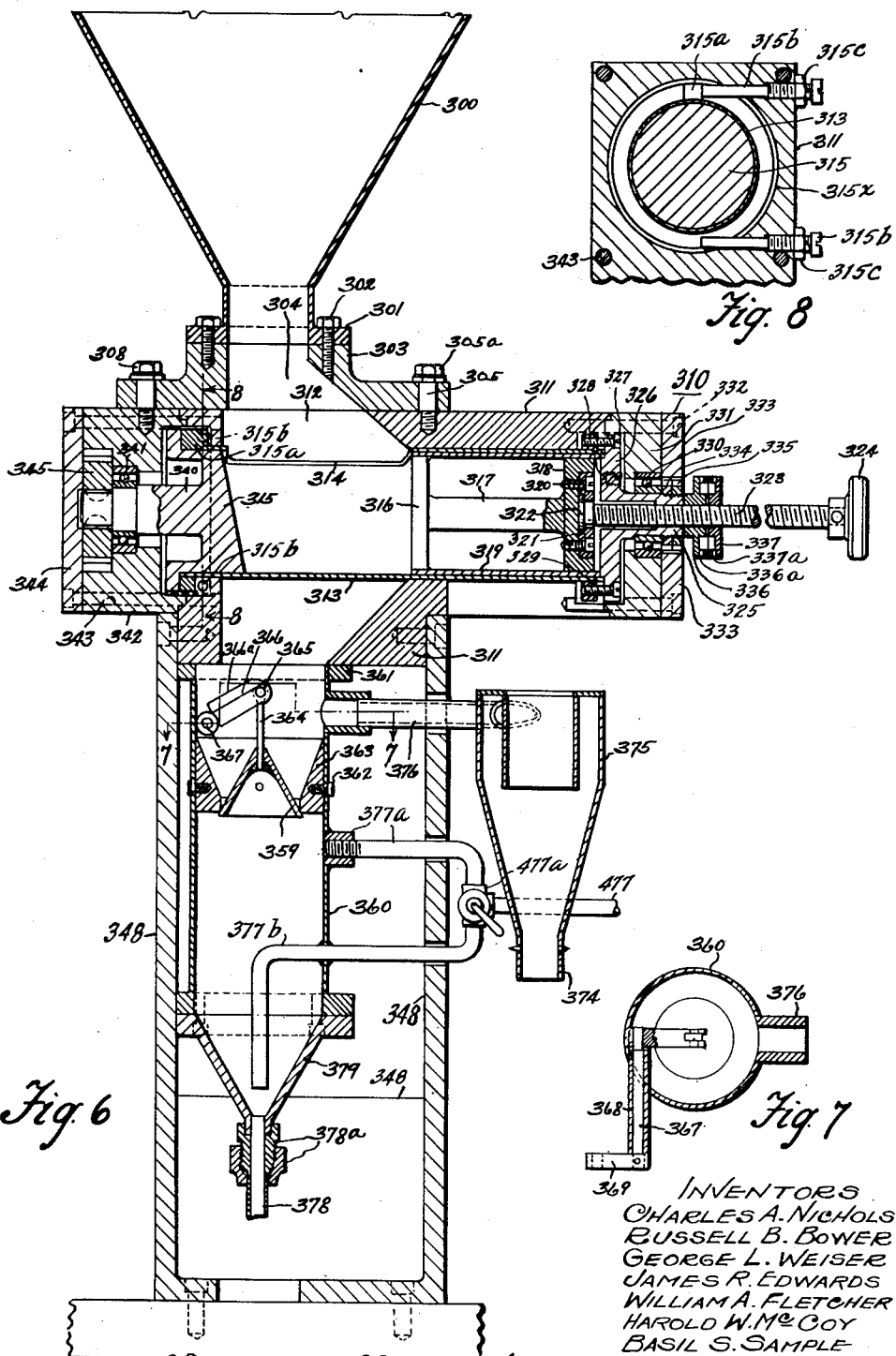

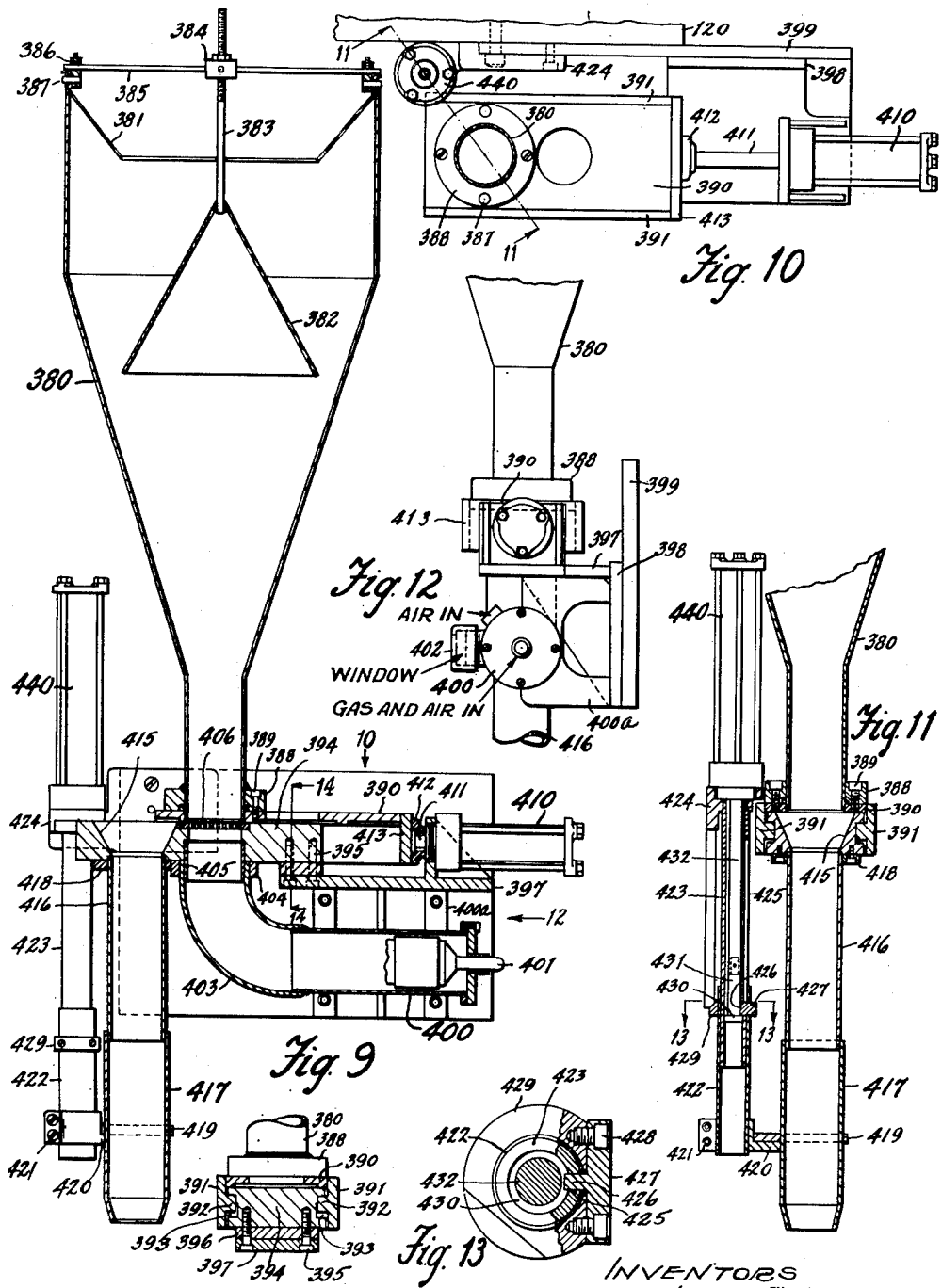

2,613,450

UNITED STATES PATENT OFFICE 2,613,450

MATERIAL HEATING AND HANDLING MEANS

Charles A. Nichols, Russell B. Bower, George L. Weiser, James R. Edwards, William A. Fletcher, and Harold W. McCoy, Anderson, Ind., and Basil S. Sample, Danville, Ill., assignors to General Motors Corporation, Detroit, Mich., a corporation of Delaware Original application August 22, 1946, Serial No. 692,274. Divided and this application June 12, 1948, Serial No. 32,605

9 Claims. (Cl. 34—57)

This application is a division of application Serial No. 692,274, filed August 22, 1946, which discloses a method of preheating molding material while in comminuted form and apparatus for carrying on the method and, in coordination with the apparatus, an injection molding machine which receives the preheated comminuted material and causes it to be forced into mold cavities and therein to be cured under heat and pressure.

The invention claimed in this application relates to apparatus for handling and preheating the comminuted molding material. The disclosed embodiment of the invention provides a hopper for receiving comminuted molding material, a measuring device which receives a predetermined quantity of material from the hopper and dumps the material into a vessel from which the material is transferred by air pressure to the top of a preheating chamber in which hot air is ascending at such velocity as to cause the material to be suspended in the chamber while being heated. At the end of the preheating period, the heating chamber is caused to discharge its contents into a compression chamber of a molding die. A companion molding die is caused to be pressed against the die having the compression chamber and the preheated material therein is forced by a piston or ram out of the compression chamber through ducts or runners connected with the die cavities in which the material is cured under heat and pressure.

Further objects and advantages of the present invention will be apparent from the following description, reference being had to the accompanying drawings, wherein a preferred embodiment of the present invention is clearly shown.

In the drawings:

Fig. 1 is a front elevation of the molding machine and material handling apparatus.

Fig. 2 is a side elevation looking in the direction of arrow 2 of Fig. 1.

Fig. 3 is a side elevation, partly broken away, of the apparatus for measuring charges of molding material and causing the same to be transferred to apparatus for heating the material prior to discharge into a mold. This view is drawn to a larger scale than the view of this apparatus which appears in Fig. 1.

Figure 15:
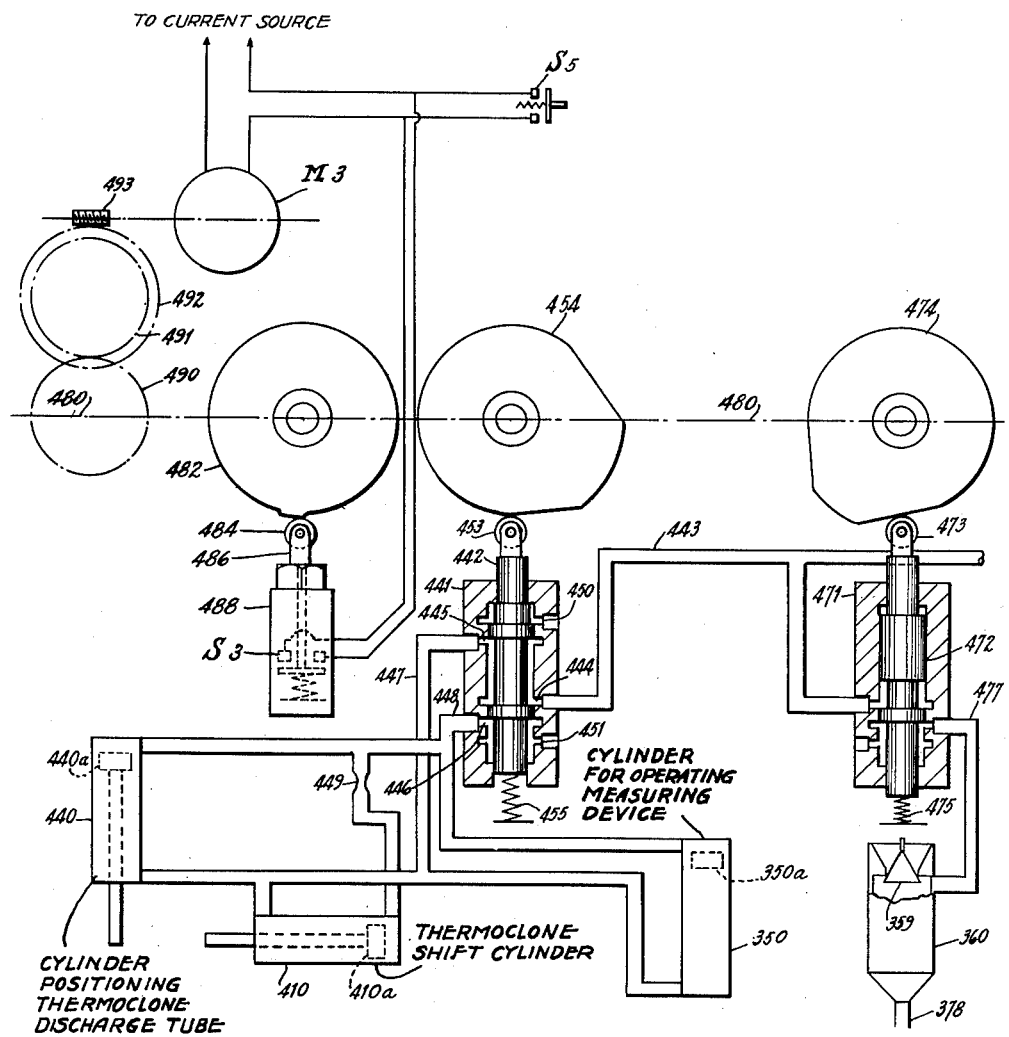

Figs. 4 and 5 are views taken in the directions of arrows 4 and 5, respectively, of Fig. 3.

Fig. 6 is a sectional view on line 6—6 of Fig. 4.

Fig. 7 is a sectional view on line 7—7 of Fig. 6.

Fig. 8 is a sectional view on line 8—8 of Fig. 6.

Fig. 9 is a sectional, fragmentary view of the apparatus for heating the molding material prior to discharge into a mold and this view is taken principally on the line 9—9 of Fig. 2, but with tube 417 lowered.

Fig. 10 is a fragmentary plan view in the direction of arrow 10 of Fig. 9, but with part 380 moved to the left.

Fig. 11 is a fragmentary, sectional view on the line 11—11 of Fig. 10.

Fig. 12 is a fragmentary, end view in the direction of arrow 12 of Fig. 9.

Fig. 13 is a sectional view on line 13—13 of Fig. 11.

Fig. 14 is a sectional view on line 14—14 of Fig. 9.

Fig. 15 is a diagram of the valves and controls pertaining to the apparatus showing in Figs. 3-14.

Referring chiefly to Figs. 1 and 2, the molding machine comprises a base 100 supporting posts 101 and 102 which support a bar 109 which supports a cylinder 110, which receives a piston (not shown) connected to a bar 120 which supports an upper die 121. Bar 120 is guided by the posts 101 and 102. The upper die 121 is adapted to engage either one or two lower dies 122, 123 mounted on an oscillatable table 125. These dies are secured to their respective supports by angle bars 124 and screws 124a (Fig. 1.) Table 125 is rotated 180° alternately in opposite direction by an hydraulic servo operated mechanism including a servo cylinder 145.

Each lower mold 122 or 123 has a compression cylinder containing a ram or piston which, when its mold is under the mold 121, is operated to effect ejection of the molding material by an hydraulic servo including a cylinder 190; and which, when its mold is in the loading position, is operated by an hydraulic servo including a cylinder 200 for the purpose of ejecting molded parts through the operation of ejector pins operatively connected with the ram.

The molding material, either in powder form or granular, is placed in a hopper 300 (Fig. 2) from which it descends to a measuring device 310 capable of containing a predetermined quantity. After the device 310 is filled, it is caused to dump its contents into a hopper 360 which is closed at its top at a certain time and then compressed air is applied to blow the contents of the hopper 360 through a pipe 378 to a heating chamber within a funnel or thermoclone 380 through which ascends the combustion products and hot air from a stove 400. While the thermoclone 380 is connected with the stove 400, a current of hot air from the stove ascends and causes the particles of molding powder to be suspended and to be heated a certain amount so that there is started a chemical reaction which is completed after the heated material is received by the cavities of the upper and lower dies. After the heating cycle, the thermoclone 380 is moved into alignment with a telescopic discharge pipe 417 which is lowered at the proper time as to discharge the contents of the thermoclone into a lower die when in the loading position. The foregoing is a brief outline of the method of handling the molding material before it is loaded into a lower die.

Referring to Figs. 3 and 6, it will be seen that the loading hopper 300 has a flange 301 by which it is attached by screws 302 to a plate 303 having a downwardly flaring opening 304. Plate 303 is pivotally supported by stud 305 upon the frame 311 of the measuring device 310. As shown in Fig. 5, plate 303 has a notch 306 for receiving a stud 307 which receives a nut 308 and a washer 309. By loosening the nut 305a on stud 305 and the nut 308 on the stud 306, the hopper and its mounting can be swung horizontally away from the opening 312 in the frame 311. Thus the hopper 300 can be moved so as to provide access into the interior of the frame 311 without lifting the hopper from the frame.

Frame 311 rotatably supports a measuring tube 313 (Fig. 6) having an oblong opening 314, through which molding powder can descend from the hopper through the passages 304 and 312. The amount of powder which the tube 313 receives depends upon the spacing between a fixed disc 315 and a movable disc 316. Disc 316 is integral with a rod 317 integral with a disc 318. A tube 319 which is slidable within the tube 313 is attached to the discs 316 and 318. Screws 320 connect the disc 318 with a disc 321 which is recessed to receive, with a running fit, the flanged head 322 of a screw 323 having a turn knob 324. Screw 323 is threaded through hub 325 of a disc 326 with screws 327 attached to a ring 328 surrounding the tube 313. By tightening the screws 327, the disc 328 is caused to move toward the disc 326 until the former engages a split wire snap ring 329 located in a groove provided by the tube 313. The hub 325 of disc 326 is journalled in a ball bearing 330 supported by a cover plate 331 which screws 332 attach to the frame 311 together with a cover plate 333. The location of the hub 325 relative to the bearing 330 is fixed by nuts 334 and 335 threaded on the hub 325, nut 334 being engageable with the inner race of bearing 330. By turning the knob 324, the screw 323 is threaded in and out of the hub 325 and the tube 319 and the disc 316 are caused to move horizontally in order to cause the tube 313 to receive a predetermined amount of molding powder. Fig. 6 shows the disc 316 in the position in which the tube 313 will receive the maximum measured amount of molding material. The screw 323 is held in a desired position of adjustment by a nut 336 which can be tightened against the right end of the hub 325 of disc 326 and which can be held in adjusted position by a lock nut 337. Nuts 336 and 337 have annular flanges which abut each other when these nuts are in engagement. The nuts can be turned by a spanner ring engageable with holes 337a or 336a in the flanges of these nuts.

The disc 315 which supports the left end of the tube 313 is integral with a shaft 340 journaled in a bearing 341 supported by a block 342 with screws 343 together with a plate 344 attached to the frame 311. Block 343 receives a gear 345 connected with the shaft 340. As shown in Fig. 4, gear 345 meshes with a rack 346 guided for vertical movement by the block 343 and attached to a rod 347 connected with a piston 350a (Fig. 15) in a cylinder 350. Cylinder 350 is attached to a frame 348 which supports the frame 311. Rod 347 is connected also with a block 351 carrying a roller 352 for engaging a cam lever 353 pivotally supported at 354 by the frame 311 and urged clockwise by a spring 355 received by a block 356 attached by screws 357 to the frame 311. Spring 355 urges downwardly a plunger 358, thereby causing the lever 353 to be urged against the roller 352. Movement of the lever 353 controls the opening and closing of a valve 359 (Fig. 6) in the mouth of the hopper 360. Hopper 360 has a flange 361 which is screwed to the frame 311. Screws 362 attached to the hopper a mouthpiece 363 providing a seat for the valve 359 which has a stem 364 connected by a pin 365 with a lever 366 attached to a shaft 367 journaled in a tube 368 (Fig. 7) welded to the hopper 360. Shaft 367 carries an arm 369 which as shown in Fig. 3, is connected by pin 370, link 371 and pin 372 with lever 353.

When piston 350a of cylinder 350 (Fig. 4) moves down, tube 313 is rotated 180°. During such movement, the valve 359 is moved down so that the contents of the tube is discharged into the hopper 360. As it discharges, some of it may fall over the knife edge 366a of the lever 366. After the tube 313 has been discharged, the piston 350a moves up so as to return the tube 313 to position for receiving more powder from the hopper 300 and so as to move the valve 359 in mouth-closing position. The rotation of the tube 313 is limited by the engagement of a lug 315a (Fig. 8) of disc 315 with either of two stop screws 315b threaded into the frame 311 and retained in adjusted position by lock nuts 315c.

Pipe 477, connected with a compressed air source through a valve 471 (Fig. 15) may be connected by a two-way valve 477a (Fig. 6) either with pipe 377a or with pipe 377b leading into the hopper 360. Some kinds of material are discharged from the hopper 360 when compressed air is directed upon it, and other kinds when the air is introduced near the outlet, which is connected by a coupling 378a with the pipe 378. Any dust laden air escaping past the valve 359 is discharged through pipe 376 to a dust collector 375, the bottom of which may be connected with a bag not shown.

Referring to Fig. 9, thermoclone 380 is provided with a fixed baffle 381 and an adjustable baffle 382 of conical formation suspended by a rod 383 threaded through a nut 384 supported by rods 385 extending through clamps 386 which pins 387 attach together with the baffle 381 to the thermoclone 380. At its lower end, the thermoclone is welded to a flange 388, which screws 389 attach to a slidable plate 390 which, as shown in Fig. 14, is connected with horizontally movable side plates 391 having lugs 392 received by grooves 393 in a bar 394 which screws 395 attach to a spacer plate 396 and to a bracket 397 which includes a vertical plate 398 (Fig. 12) attached to another vertical plate 399 which is attached to the bar 109 which supports the die closing cylinder 110 (Fig. 2). Plate 398 supports the stove 400 into which there is introduced at 401 under pressure a combustible gas, combustion being supported by air previously mixed with the gas. Additional air to furnish necessary air volume is introduced through a side port in the stove. 402 is a window through which the flame is observed. The products of combustion, together with the heated air, pass through a curved pipe 403 attached to a flange 404 screwed to the bar 394 and through a connecting sleeve 405 and through an apertured plate 406 and upwardly through the thermoclone 380. As the molding material is blown through the pipe 378 into the hopper, it is caught up by the rising currents of hot air and combustion products and is caused to be heated to such extent that there is initiated chemical reaction further carried on in the die cavities where, under pressure as well as heat, the curing of the resin is completed.

After the preheating cycle in the thermoclone 380 has been completed, the thermoclone is moved bodily to the left from the position shown in Figs. 1 and 9 by means including a cylinder 410 having a piston 410a (Fig. 15) connected with a rod 411 which a plate 412 swiveledly connects it to a plate 413 which is connected with the plates 390 and 391 (Fig. 14). At the proper time, the piston 410a is caused to move left to move the lower end of the thermoclone away from the stove outlet 403 and into communication with a funnel-like opening 415 in bar 394 whence the contents of the thermoclone are discharged by gravity into the open die at the loading station through a telescopic tube comprising members 416 and 417 which are caused to be extended while the contents of the thermoclone 380 is being discharged.

The upper end of tube 416 is attached to a flange 418 attached to the underside of bar 394. The tube 417 is attached to a plate 419 (Fig. 11) attached to a bracket 420 caused by screws 421 to be clamped around a tube 422. Tube 422 telescopically engages a tube 423 attached at its upper end to a bracket 424 attached as shown in Fig. 10 to the plates 399 and 109. Tube 423 has a side slot 425 for receiving a lug 426 (Fig. 13) integral with a plate 427 which screws 428 attach to a ring 429 attached to the tube 422. The tube 417 is supported upon a flange 430 of a rod 431 attached to the rod 432 of a piston 440a (Fig. 15) received by a cylinder 440 which is supported by the bracket 424. Piston 440a can move down until it bottoms in cylinder 400. The discharge tube 417 is lowered when the time comes to fill a lower die. After the die has been filled, compressed air is caused to enter the lower end of the cylinder 440 in order to raise rod 432, flange 430, lug 426, bracket 429, tube 422 and tube 417. It is desirable that the tube 417 be up while unloading the work from the die at the loading station and preparing it from the reception of a charge of preheated molding material.

The control of the mechanism for handling the molding powder is illustrated diagrammatically in Fig. 15. The admission of pressure fluid (compressed air) to the ends of cylinders 350, 410 and 440 is controlled by a valve unit 441 which includes a movable valve 442 for controlling the distribution of pressure fluid entering through a pipe 443 and an inlet port 444 to either of distribution ports 445 and 446 connected respectively with pipes 447 and 448. Pipe 447 is connected with the lower end of cylinder 350 with the left end of cylinder 410 and with the lower end of cylinder 440. Therefore when the valve 442 is in the position shown, piston 350a will be forced up, piston 410a will be forced right and piston 440a will be forced up. Pipe 448 is connected with the upper ends of cylinders 350 and 440 and through a restriction 449 with the right end of cylinder 410. When valve 442 is caused to move down, the right end of cylinder 410 and the upper ends of the cylinders 350 and 440 are connected with the pressure pipe 443 which results in the left movement of piston 410a and downward movement of pistons 350a and 440a. The restriction 449 provides for downward movement of piston 440a ahead of left movement of piston 410a. Therefore the discharge tube 417 is lowered ahead of movement of the thermoclone 380 over the discharge outlet 415. The valve 441 provides exhaust ports 450 and 451 which are so controlled that when pressure fluid is applied to one end of each of the cylinders 350, 410 and 440, the other ends will be connected with exhaust or with drain in case hydraulic pressure is used. Valve 442 carries a roller 453 for engaging a control cam 454 against which the roller is urged by a spring 455. Cam 454 effects the dumping of the contents of the measuring device into the hopper 360 and the closing of the hopper and return of the measuring device to position for receiving another charge while effecting the movements for discharge of the thermoclone and its return to the stove.

While the hopper 360 is closed at the top, compressed air is caused to pass from pipe 443 and through valve unit 471 and pipe 477 into the hopper to force the molding material into the thermoclone. Unit 471 has a movable valve 472 carrying a roller which a spring 475 urges against a cam 474 which depresses the valve member 472 after valve member 442 rises.

Cams 454 and 474 are rotated counterclockwise by a shaft 480 which carries a switch operating cam 482 which is engaged by a roller 484 carried by a plunger 486 slidable in switch unit 488 and urged upwardly by a spring not shown. Unit 488 contains a switch S3. Near the end of one revolution of shaft 180, switch S3 is opened by cam 482 to disconnect motor M3 from its current source. The motor M3 coasts to a stop at the end of one revolution of shaft 480. To start the motor M3, a switch S5 is closed to by-pass switch S3 by means which, as disclosed in application Serial #692,274, operates near the end of the curing cycle. Shaft 480 is connected by spur gears 490 and 491 and by worm gear 492 and worm 493 with a cam shaft operating motor M3.

Fig. 15 shows the status of the apparatus operated by motor M3 at the end of its cycle when cam 484 has opened the motor stopping switch S3. When switch S3 is by-passed by the switch S5, motor M3 starts rotating shaft 480 counterclockwise. Cam 474 immediately lowers valve 472 to cause the measured charge in hopper 360 to be transferred to the thermoclone. After about 270° rotation of shaft 480 during which the charge is heated, cam 454 lowers valve 442 to cause the thermoclone to discharge its contents into a die at the loading station. Concurrently, piston 350a moves down to cause a measured charge to be received by hopper 360. Before the end of one revolution of shaft 480, switch S5 is opened so that the switch S3 is effective to cause the motor M3 to stop at the end of one revolution of shaft 480.

The apparatus facilitates the injection molding of thermosetting plastic material, phenolic resins for example, by providing for the preheating of the material in comminuted form as it is customarily received from the supplier. The charge of powdered (comminuted) plastic material is introduced at the top of the thermoclone and the particles fall until they reach a level where the velocity of the hot air upward is sufficient to overcome the force of gravity action on the particles, so that the particles remain suspended, more or less, stationary. This suspension is inherently stable, since a further downward movement of the particles will bring them into a region of greater air velocity thereby forcing them up, while the reverse is true of upward movement of the particles. Substantially uniform heating of all the particles of the charge is rapidly obtained. The temperature to which the particles are heated may depend on the kind of plastic material. Some kinds of thermosetting phenolic material which requires that the temperatures of the dies be 280° F. to 400° F. should be heated in the thermoclone to about 250° F. to 275° F. For this purpose, the temperature of the hot air entering the bottom of the thermoclone may be about 280° F. to 400° F. and its entering velocity about 3600 feet per minute. The duration of the heating cycle will depend on the quantity of the charge to be heated.

While the embodiment of the present invention as herein disclosed, constitutes a preferred form, it is to be understood that other forms might be adopted.

What is claimed is as follows:

1. Means for uniformly heating loose molding powder comprising means for supplying a heated drying gas, a horizontal plate, a series of ducts encompassed by the plate communicating with the means for supplying the heated drying gas and for directing the heated gas upwardly through the plate, a powder discharge passageway in the plate spaced from the ducts, a carriage resting upon and slidable over the plate, and rectilinear guide rails mounted for guiding the carriage over the plate, a vertical passageway through the carriage, a funnel member mounted over the passageway, means for reciprocating the carriage on the plate while being guided by the rails to alternately register with the ducts or with the discharge passageway.

2. Means for uniformly heating loose molding powder comprising a horizontal plate, a pair of straight parallel rails thereon, a series of ducts in the plate and means for directing heated air upwardly therethrough, a discharge passageway in the plate spaced from the air ducts, a slide carriage, a vertical passageway through the carriage, a funnel mounted over the passageway, said funnel being provided with means for preventing the powder in said funnel from being blown out of the funnel during the drying operation, and means for reciprocating the carriage on the plate between the rails to register with the ducts and with the discharge passageway.

3. Means for uniformly heating loose molding powder comprising a horizontal plate, a pair of straight parallel rails thereon, a series of ducts in the plate and means for directing heated air upwardly therethrough, a discharge passageway in the plate spaced from the air ducts, a slide carriage, a vertical passageway through the carriage, a funnel mounted over the passageway, said funnel being provided with means for preventing the powder in said funnel from being blown out of the funnel during the drying operation, and means for reciprocating the carriage on the plate between the rails to register with the ducts and with the discharge passageway.

4. Means for uniformly heating loose molding powder comprising a horizontal plate, a pair of straight parallel rails thereon, a series of ducts in the plate, means for directing heated air upwardly therethrough, a discharge passageway in the plate spaced from the air ducts, a slide carriage, a vertical passageway through the carriage, a vessel supported in said passageway and comprising a container for the powder to be heated, said vessel being provided with means for preventing the powder in said vessel from being blown out of the vessel during the drying operation, and means for reciprocating the carriage on the plate between the rails to register with the ducts and with the discharge passageway.

5. Means for uniformly heating loose molding powder comprising a horizontal plate, a pair of straight parallel rails thereon, a series of ducts in the plate and means for directing air under pressure upwardly therethrough, means for heating said air prior to its delivery to the plate, a discharge passageway in the plate spaced from the air ducts, a slide carriage, a vertical passageway through the carriage, a funnel mounted over the passageway, said funnel being provided with means for preventing the powder in said funnel from being blown out of the funnel during the drying operation, and means for reciprocating the carriage on the plate between the rails to register with the ducts and with the discharge passageway.

6. Means for uniformly heating loose molding powder comprising a horizontal plate, a pair of straight parallel rails thereon, a series of ducts in the plate and means for directing air upwardly therethrough, means for heating said air prior to its delivery to the plate, means for regulating the temperature of the air, a discharge passageway in the plate spaced from the air ducts, a slide carriage, a vertical passageway through the carriage, a funnel mounted over the passageway, said funnel being provided with means for preventing the powder in said funnel from being blown out of the funnel during the drying operation, and means for reciprocating the carriage on the plate between the rails to register with the ducts and with the discharge passageway.

7. Means for uniformly heating loose molding powder comprising a horizontal plate, a pair of straight parallel rails thereon, a series of ducts in the plate and means for directing heated air upwardly through the plate, a discharge passageway in the plate spaced from the air ducts, a slide carriage on the plate, a vertical passageway through the carriage, a funnel mounted over the passageway, said funnel being provided with means for preventing the powder in said funnel from being blown out of the funnel during the drying operation, a piston for the carriage and means to reciprocate the piston and cause the carriage to move between the rails.

8. Means for uniformly heating loose molding powder comprising a horizontal plate, a pair of straight parallel rails thereon, a series of ducts in the plate and means for directing heated air upwardly therethrough, a discharge passageway in the plate spaced from the air ducts, a slide carriage on the plate, a vertical passageway through the carriage, a funnel mounted over the passageway, said funnel being provided with means for preventing the powder in said funnel from being blown out of the funnel during the drying operation, a piston for the carriage and pneumatic means to reciprocate the piston and cause the carriage to move between the rails.

9. Apparatus for handling molding material for use in die molding operations comprising a material heating vessel having a discharge opening in the bottom thereof through which the heated material is discharged by the effect of gravity, means for introducing the material to be heated into the top of said vessel, means for heating the material while in said vessel, means for moving said vessel to a position where the material is subject to the action of said heating means, a duct for conveying the heated material from said vessel to a die, and means operable upon completion of the heating operation to move said vessel into position to communicate with said duct.

CHARLES A. NICHOLS.
RUSSELL B. BOWER.
GEORGE L. WEISER.
JAMES R. EDWARDS.
WILLIAM A. FLETCHER.
HAROLD W. McCOY.
BASIL S. SAMPLE.

REFERENCES CITED

The following references are of record in the file of this patent:

UNITED STATES PATENTS

| Number | Name | Date |
|---|---|---|
| 1,086,843 | Nissinen | Feb. 10, 1914 |
| 1,096,785 | Jensen | May 12, 1914 |
| 1,299,791 | Seaman | Apr. 8, 1919 |
| 1,535,991 | Crom | Apr. 28, 1925 |
| 1,764,998 | Bailey | June 17, 1930 |
| 1,970,499 | Dent | Aug. 14, 1934 |
| 1,985,250 | Goss et al. | Dec. 25, 1934 |
| 2,008,446 | Grindle | July 16, 1935 |
| 2,069,193 | Behr et al. | Jan. 26, 1937 |
| 2,089,663 | Richeson | Aug. 10, 1937 |
| 2,327,282 | McComb | Aug. 17, 1943 |
| 2,330,545 | Benoit | Sept. 28, 1943 |
| 2,474,952 | Miskella | July 5, 1949 |

FOREIGN PATENTS

| Number | Country | Date |
|---|---|---|
| 305,283 | Italy | Feb. 1, 1933 |
| 411,152 | Germany | Mar. 24, 1925 |
| 690,213 | France | June 16, 1930 |